United States Patent
Damm

(10) Patent No.: US 9,023,163 B2
(45) Date of Patent: May 5, 2015

(54) METHOD FOR LAMINATING ESSENTIALLY PLATE-SHAPED WORK PIECES

(75) Inventor: Norbert Damm, Karlsdorf-Neuthard (DE)

(73) Assignee: Robert Bürkle GmbH, Freudenstadt (DE)

( * ) Notice: Subject to any disclaimer, the term of this patent is extended or adjusted under 35 U.S.C. 154(b) by 760 days.

(21) Appl. No.: 13/302,293

(22) Filed: Nov. 22, 2011

(65) Prior Publication Data

US 2012/0132360 A1   May 31, 2012

(30) Foreign Application Priority Data

Nov. 30, 2010   (DE) .......................... 10 2010 052 780

(51) Int. Cl.
| | |
|---|---|
| *B32B 37/10* | (2006.01) |
| *B32B 37/00* | (2006.01) |
| *B32B 37/12* | (2006.01) |
| *B32B 37/18* | (2006.01) |

(52) U.S. Cl.
CPC ........... *B32B 37/003* (2013.01); *B32B 37/1009* (2013.01); *B32B 37/1207* (2013.01); *B32B 37/18* (2013.01); *B32B 2309/022* (2013.01); *B32B 2309/04* (2013.01); *B32B 2309/12* (2013.01); *B32B 2457/12* (2013.01)

(58) Field of Classification Search
USPC ............. 156/257, 99, 103–106, 285, 286, 87, 156/381, 382
See application file for complete search history.

(56) References Cited

U.S. PATENT DOCUMENTS

| | | | | |
|---|---|---|---|---|
| 4,180,426 | A | * | 12/1979 | Oustin et al. .................. 156/104 |
| 4,362,587 | A | | 12/1982 | Baudin et al. |
| 4,647,327 | A | | 3/1987 | Rase |
| 5,593,532 | A | | 1/1997 | Falk et al. |
| 5,698,053 | A | | 12/1997 | Carroll et al. |
| 6,342,116 | B1 | | 1/2002 | Baudain et al. |
| 2001/0007270 | A1 | | 7/2001 | Balduin et al. |
| 2010/0018646 | A1 | * | 1/2010 | Metzger et al. ............... 156/285 |

FOREIGN PATENT DOCUMENTS

| | | |
|---|---|---|
| CN | 101618625 | 1/2010 |
| DE | 2 006 655 | 9/1970 |
| DE | 30 44 717 | 8/1981 |
| DE | 33 15 331 | 11/1983 |
| DE | 199 03 171 | 8/2000 |
| DE | 102008030927 | 10/2009 |
| GB | 1292905 | 10/1972 |
| WO | 94/29106 | 12/1994 |

* cited by examiner

*Primary Examiner* — Christopher Schatz
(74) *Attorney, Agent, or Firm* — Volpe and Koenig, P.C.

(57) ABSTRACT

A method for laminating essentially plate-shaped work pieces with a thermally activated adhesive layer, particularly photovoltaic modules. Work pieces are inserted into a vacuum chamber having a compression element dividing the vacuum chamber in a gas tight fashion that can be raised and lowered by pressure differences. The compression element presses against the work piece which in turn presses against a heating plate which forms a lower side of the vacuum chamber, with processing heat being transferred into the work piece to soften the adhesive. The work piece is first impinged by the compression element with a slight load from approx. 2% to 10% of the defined processing load, and is simultaneously kept below the adhesive activation temperature. Thereafter, the slight load is lifted off the work piece and the work piece is heated to the activation temperature and impinged via the compression element with the processing load.

10 Claims, No Drawings

METHOD FOR LAMINATING ESSENTIALLY PLATE-SHAPED WORK PIECES

CROSS-REFERENCE TO RELATED APPLICATIONS

This application claims the benefit of German Patent Application No. 10 2010 052 780.7, filed Nov. 30, 2010, which is incorporated herein by reference as if fully set forth.

BACKGROUND

The invention relates to a method for laminating photovoltaic modules and similar, essentially plate-shaped work pieces, which include at least one thermally activated adhesive layer under the influence of pressure and heat.

In such a method, usually a one-layer or multi-layer vacuum lamination press is used comprising one, and in the multi-layer case several, vacuum chambers. The vacuum chamber is formed by an upper and a lower chamber half, which are movable in reference to each other in order to open and close the vacuum chamber. It is divided in a gas-tight fashion by a compression means, and said compression means can be raised or lowered within the vacuum chamber by way of pressure differences.

Commonly such compression means represent a flexible diaphragm, which divides the vacuum chamber into a product chamber that can be evacuated and is embodied to accept at least one work piece, and a pressure chamber that can be evacuated and/or impinged with pressure. Due to a pressure difference generated in the vacuum chamber by evacuating the product chamber and/or by impinging the pressure chamber with pressure, the flexible diaphragm is pressed against the work piece, thus pressing the work piece directly or indirectly against a plate limiting the vacuum chamber, in the normal case the floor of the vacuum chamber, with perhaps a conveyer belt traveling between the plate and the work piece, and the load required for lamination being applied thereby onto the work piece. In general, this plate, usually the bottom of the vacuum chamber, is formed by a heating plate so that the processing heat necessary for lamination is directly introduced into the work piece.

In a method according to the present type, particularly a photovoltaic module or several work pieces, simultaneously is/are introduced into the vacuum chamber of the vacuum lamination press used, and the vacuum chamber is closed; for reasons of simplification, in the following only one work piece is being discussed. Then the vacuum chamber is evacuated and the compression means is pressed against the work piece by way of ventilating and/or impinging with pressure the part of the vacuum chamber not housing any work piece and said piece is thereby directly or indirectly pressed against the plate limiting the vacuum chamber. This plate is usually the bottom of the vacuum chamber.

The process heat required for the lamination process is usually transferred into the work piece by the bottom of the vacuum chamber which is embodied as a heating plate, with the work piece being pressed against it by the compression means. The pressure and the process heat combined then ensure the softening and/or activation of the adhesive layer and, if applicable, also its curing and/or cross-linking. However, other forms of inserting process heat are also possible.

Usually the evacuation of the vacuum chamber occurs such that first the pressure chamber of the vacuum chamber located above the compression means is evacuated in order to pull the compression means upwards towards the upper chamber half. Then, usually temporarily off-set, the product chamber comprising the work piece and located underneath the compression means is evacuated, with the evacuation of both chambers of the vacuum chamber being controlled such that always a pressure difference remains between the pressure chamber and the product chamber, which keeps the compression means in the upper half of the chamber and prevents that the compression means prematurely contact the work piece.

When the product chamber of the vacuum chamber has been evacuated to a target pressure, which usually is below one millibar, the pressure chamber is ventilated so that the pressure difference inverses between the pressure chamber and the product chamber, and the compression means contacts the work piece. Then a desired compression of the compression means is adjusted, usually by controlling the gas pressure in the pressure chamber, in order to generate the required load on the work piece necessary for lamination.

Here, according to prior art, particularly the product chamber of the vacuum chamber shall be evacuated rapidly, namely prior to any relevant heating of the work piece, at least prior to the activation of the adhesive effect of the adhesive layer. This allows that potential air enclosures (air trapped between the layers of the work piece) or gases potentially developing during the heating process are evacuated from the work piece before any curing and/or cross-linking of the adhesive in the adhesive layer begins. Because gas bubbles in the finished laminated work piece considerably compromise its life span or, in the worst case scenario, lead to an immediate worthlessness of the work piece, thus the production of discards. This particularly applies to photovoltaic modules.

WO 94/29106 A1 describes a method for laminating photovoltaic modules with adhesive layers that can be cured under the influence of pressure and heat. Here, a vacuum lamination press is used, in which a diaphragm is arranged as a flexible compression means, which divides the vacuum chamber into a product half and a pressure half. The process heat is inserted via a heating plate into the photovoltaic module, which indirectly impinges the work piece through a support plate. Upon closing the vacuum chamber it is rapidly evacuated in order to remove trapped air and other gases from the photovoltaic module before it is considerably heated. Then the compression half of the vacuum chamber located above the diaphragm is ventilated so that the diaphragm applies a load upon the work piece, generated by the pressure difference, and particularly also starts and/or accelerates the heat transfer from the heating plate into the work piece.

In WO 94/29106 A1 the photovoltaic modules in the vacuum lamination press are only preliminarily laminated because the vacuum chamber is opened without any cooling process, the preliminarily laminated work pieces are transferred into a curing kiln, and here the adhesive layers are hardened at high temperatures. Here, it is utilized that the adhesive layers commonly used in photovoltaic modules develop such an adhesive effect already at the beginning of the curing and/or cross-linking process so that any penetration of air from the outside of the work piece between its individual layers no longer needs to be feared at an early period of time and the further lamination therefore no longer needs to occur in a vacuum. When the work pieces no longer need to remain in the vacuum lamination press until the adhesive layers are entirely cured and/or cross-linked, but the further curing and/or cross-linking can occur in the curing kiln, the clock time of the vacuum lamination press and thus the processing speed of the entire installation can be increased.

SUMMARY

Using this prior art, the present invention is based on the objective to yield better work results by improving the above-described known processes and/or to allow even shorter clock times in the vacuum lamination press.

This objective is attained in a method according to the invention. Preferred further developments of the method according to the invention are disclosed below and in the claims.

The method according to the present invention differs from previous processes quite essentially such that the work piece, after the insertion into the vacuum chamber, is first impinged by the compression means with a low load from approximately 2% to approximately 10% of the processing load, which is preferably equivalent to a specific surface load from approximately 20 mbar to approximately 200 mbar and further preferred from approximately 50 mbar to approximately 100 mbar. Here, the work piece is held at a temperature below the activation temperature of the adhesive layer. Subsequently the slight load is taken off the work piece. Only then, the work piece is heated to the activation temperature of the adhesive layer and the work piece is impinged with the processing load via the compression means. Beneficially the compression means first presses the work piece against the heating plate, which then quickly heats the work piece and its adhesive layer rapidly reaches its activation temperature.

Within the scope of the present invention it is preferred that the work piece, prior to application or during the application of the slight load, is heated to a preheating temperature, at which the adhesive layer softens but which is below the activation temperature of the adhesive layer. This preheating can be caused by the application of a low load, because here the work piece is preferably pressed against the heating plate, which allows a good heat transfer from the heating plate to the work piece. Within the scope of the invention it is also possible to heat the work piece to the preheating temperature prior to its insertion into the vacuum chamber. This may help to shorten the clock times of the vacuum lamination press, because the thermal energy inserted previously into the work piece no longer needs to be inserted into the work piece in the vacuum chamber.

According to the invention it has been recognized that the significant amount of gas removed from conventional adhesive layers during the evacuation, such as particularly ethylene vinyl acetate films (EVA-films), which according to prior art mandatorily need to be suctioned off, before the adhesive layer is considerably softened and shows any beginning adhesive effect, is only removed from the adhesive layer to a large extent because the ambient pressure is strongly reduced by way of evacuation. Thus, according to prior art the evacuation itself therefore generates a large portion of the gases to be suctioned off by way of evacuation in order to prevent any damaging effects from developing.

By loading the work piece with a slight preliminary load according to the invention the vacuum chamber can be evacuated without causing any development of processing gases from the adhesive layer. Because by the slight load these processing gases remain dissolved in the adhesive layer even when the work piece, as suggested according to a preferred embodiment of the present invention, has already been preliminarily heated to the adhesive layer softening or is preliminarily heated during the application of the slight load.

The outgassing and suctioning of gasses out of the adhesive layer according to prior art may even be disadvantageous because frequently the adhesive layers include additives, with their remaining in the adhesive layer being undesirable. When using EVA as the adhesive substance, for example peroxides are used as a reactant for the polymer reaction of the desired cross-linking. In thermoplastics as the adhesive layers plasticizers and adhesive agents are added as volatile additives, which also should not be suctioned off. The slight load not only keeps dissolved the volatile components of the adhesive layers of particularly common photovoltaic modules and hinders them from outgassing; furthermore it ensures that any trapped air already present in a gaseous form between the individual layers of the work piece, particularly a photovoltaic module, can be laterally pressed out of the work piece and suctioned off by way of evacuating the vacuum chamber. This surprisingly also works when the work piece has already been preheated to such an extent that the adhesive layer softens and the adhesive effect starts.

Within the scope of the present invention the vacuum chamber may already be evacuated prior to the application of the slight load upon the work piece or even during the application of said slight load. As described above, the slight load according to the invention prevents the development of outgassing from the adhesive layer even when the work piece has been or is being preheated to the preheating temperature. Other gases still present in the work piece, such as particularly trapped air, are also reliably suctioned off. This leads to a significantly lower formation of bubbles in the work piece and the work results achieved by the method according to the invention are better than those by methods according to prior art.

It has shown that it is beneficial to evacuate the vacuum chamber prior to or during the application of the slight load upon the work piece only to a preliminary vacuum, which for example may range from 150 mbar to preferably up to 5 mbar, and the vacuum chamber is only completely evacuated after the removal of the slight load from the work piece, particularly below 1 mbar, before the compression means apply the processing load upon the work piece and the actual lamination process begins.

Within the scope of the invention the processing load can be applied upon the work piece as soon as its adhesive layer has reached a temperature from approximately 70% to approximately 100% of the activation temperature. Because it has been recognized that the adhesive layer assumes a viscous state when only approximately 70% of the activation temperature has been reached, which evenly distributes the mechanical pressure at all sides. The silicon solar cells commonly used in photovoltaic modules are highly fragile. When a photovoltaic module with a layer of silicon solar cells is impinged with a load, as long as the adhesive layer has not been softened, this always leads to a breaking of the solar cells. However, when the adhesive layer has softened and the solar cells are accordingly embedded in a low-viscous mass the load required for lamination can be applied upon the module without risking that the solar cells break.

In this context it has surprisingly shown that when sufficient adhesive material is used to entirely embed the layer of solar cells in a mass liquid during the lamination process, even silicon solar cells remain safe from breaking when a considerably higher processing load is selected than commonly used in prior art. In prior art, the lamination process occurs in the vacuum lamination press at a specific surface load approximately equivalent to the ambient pressure, thus generally approximately 1000 mbar. Within the scope of the present invention it is preferred to laminate at a processing load with a specific surface load above the ambient pressure, thus above approximately 1020 mbar, namely preferably above approximately 1500 mbar to approximately 2000 mbar. This occurs such that the part of the vacuum chamber, divided in a gas-tight fashion by the compression means in which no work piece is located, is not only ventilated but impinged with pressure in a targeted fashion.

Here, according to the invention it has been shown that by an increased processing load not only a cross-linking and/or curing speed is accelerated but that here the processing gases developing by the high temperatures in the adhesive layer as well as any trapped air perhaps still present are kept dissolved or made to become dissolved in the curing and/or cross-linking adhesive layer, which even more effectively prevents the formation of disadvantageous bubbles in the work piece than prior art. The measures of a considerably increased load compared to prior art therefore improves on the one hand the work results and on the other hand considerably shortens the clock time.

A preferred further embodiment of the method according to the invention comprises that the work piece, preheated according to the invention, is laminated under a fully established vacuum in the vacuum chamber and at a processing temperature which is higher than the activation temperature of the adhesive layer used and preferably exceeds approximately 110° C. and further preferred exceeding 120° C., as well as under the influence of a processing load amounting to at least a surface load from approximately 900 mbar to approximately 1000 mbar, preferably however from 1020 mbar to approximately 2000 mbar, this lamination process is interrupted after the generation of a first adhesive effect of the adhesive layer to encapsulate the work piece in an air-tight fashion, then the work piece is moved into a downstream provided laminator, and here lamination continues under processing temperature and the same or an increased processing load.

When the application of a slight load according to the invention is combined as early as during the evacuation of the vacuum chamber with a preheating of the work piece, with the preheating occurring outside the vacuum chamber or preferably during the application of the slight load, the clock time of the lamination process in the vacuum lamination press is advantageously shortened. As already mentioned, this can be additionally supported by a considerably higher processing load being applied than commonly used in prior art. In case of preheated work pieces, this may additionally affect said work piece earlier than previously possible, without risking in the primary application of the method according to the invention, the lamination of photovoltaic modules, to break the solar cells.

This shortened clock time in the vacuum lamination press is then optimally used for shortening the lamination period overall when the lamination press is interrupted after an airtight encapsulation of the work piece has been achieved, and the work piece is brought to a subsequent laminator in order to here be further laminated under processing temperature and processing load.

According to another preferred embodiment of the method according to the invention the lamination process in the subsequent laminator with an increased load may not be required to last until the adhesive layer is completely cured and/or interlaced. Rather, these this process may also be interrupted and the still unfinished laminated work pieces may be brought into a curing kiln known per se, where then the curing and/or cross-linking process is finished. This way, the very short clock time in the vacuum lamination press according to the invention can also be maintained in the subsequent laminator, resulting in the entire process to occur much faster.

In order to increase the processing speed even more, as known per se, finally cooling stations may be provided in which the work pieces are cooled in a clocked fashion after the lamination process was completed.

DETAILED DESCRIPTION OF THE PREFERRED EMBODIMENTS

In the following an exemplary embodiment of the method according to the invention is described and explained in greater detail.

A photovoltaic module, comprising a glass cover, a layer of silicon solar cells electrically connected to form a circuit, and a rear film as well as an EVA-film inserted between the glass cover and a layer of solar cells and/or a layer of solar cells and a rear film as a thermally activated adhesive layer was laminated using the method embodied according to the invention.

First, the above-mentioned layers were placed upon each other and this layered stack was brought into the vacuum chamber of a vacuum lamination press. This conventionally embodied vacuum lamination press included a vacuum chamber with a lower chamber half and an upper chamber half that can be raised and lowered, with the upper chamber half essentially being formed by a heating plate. At the upper chamber half a diaphragm frame was arranged with sealing, circumferential seals both in reference to the upper chamber half as well as the lower chamber half and via this diaphragm frame a flexible silicon diaphragm was stretched as the compression means. The work piece still comprising a layered stack was inserted into the vacuum chamber on a conveyer belt, traveling between the upper and the lower chamber halves. This processing step lasted about 30 seconds.

Then the vacuum lamination press was closed and by placing the diaphragm thereon and creating a slight load of approx. 100 mbar the work piece was preheated due to the contact created thereby between the work piece and the heating plate to a preheating temperature of approx. 100° C. This preheating phase lasted again approx. 30 seconds, with simultaneously the product chamber between the diaphragm and the heating plate in which the work piece and the conveyer belt were located, being evacuated to a gas pressure of approx. 5 mbar.

After these additional 30 seconds of the preheating phase the diaphragm was lifted off the work piece so that the heat transfer from the heating plate into the work piece was severely slowed down, and the product chamber was evacuated to the vacuum necessary for lamination, amounting to less than 1 mbar. This evacuation lasted approx. 90 seconds, with the temperature of the work piece increasing from approx. 100° C. (preheating temperature) to approx. 120° C. due to the effects of radiation heat and low thermal conductivity effects.

Due to the fact that at a temperature of 120° C. the activation temperature of the EVA film was already reached, the actual lamination process began immediately thereafter by the diaphragm once more being placed upon the work piece and the pressure chamber above the diaphragm being ventilated so that the diaphragm applied a specific surface load amounting to slightly more than 1000 mbar upon the work piece. Here, the processing temperature in the work piece increased to 150° C. This lamination of the work piece under a processing load of slightly more than 1000 mbar and a processing temperature of approx. 150° C. was performed over a period of approx. 60 seconds, so that here a first processing cycle totaling approx. 3.5 minutes developed.

After the expiration of this period, the lamination process was interrupted by completely ventilating the vacuum chamber of the vacuum lamination press and then opening the press. Subsequently a transfer occurred into a downstream arranged laminator within approx. 30 seconds so that the temperature of the work piece did not significantly reduced.

After the laminator was closed, in which the work piece was still kept at a processing temperature of approx. 150° C., the work piece was impinged with an increased load of up to 2000 mbar. Here the increase in pressure occurred within approx. 30 seconds and the increased load as well as the effect of the processing temperature was maintained for the duration of approximately 3 minutes.

After the end of this second processing phase of again approximately 3.5 minutes, the laminator was opened and the work piece, again within approx. 30 seconds to prevent any cooling, brought into the curing kiln where it was kept at the processing temperature without any impingement of pressure in order to conclude the lamination process. This again lasted approximately 3.5 minutes.

This exemplary embodiment of the method according to the invention represents a process with ultra-short processing cycles of approx. 3.5 minutes in three processing steps. When the processing steps are each performed in multi-layered laminators a very high capacity develops. In tests of the applicant photovoltaic modules with mono-crystalline silicon solar cells were laminated according to the above-described method without any bubbles and waste as well as without any breakage of solar cells.

The invention claimed is:

1. A method for laminating essentially plate-shaped work pieces with at least one thermally activated adhesive layer under effects of pressure and heat, comprising:
   inserting one or more work pieces into a vacuum chamber of a vacuum lamination press having a compression means, which divides the vacuum chamber in a gas-tight fashion and can be raised or lowered via pressure differences,
   evacuating the vacuum chamber,
   pressing the compression means, by way of at least one of ventilation or pressure impingement of a part of the vacuum chamber in which no work piece is located, against the work piece and said work piece thereby being pressed directly or indirectly against a plate, and transferring processing heat into the work piece, by which the adhesive layer is heated and also softened, and upon reaching an activation temperature and based on the influence of a defined processing load by the compression means activating the adhesive through a combination of pressure and temperature, wherein
   the work piece, after being inserted into the vacuum chamber, is first impinged by a slight load from approx. 2% to approx. 10% of the defined processing load, with the work piece simultaneously being kept at a temperature below an activation temperature of the adhesive layer, and thereafter the slight load is removed from the work piece, and then the work piece is heated to the activation temperature of the adhesive layer and impinged via the compression means with the defined processing load.

2. The method according to claim 1, wherein the work piece prior to the application or during the application of the slight load is heated to a preheating temperature, at which the adhesive layer softens but which is lower than the activation temperature of the adhesive layer.

3. The method according to claim 2, wherein the heating is performed such that the adhesive layer in the work piece is brought to the preheating temperature ranging from approx. 80° C. to approx. 120° C.

4. The method according to claim 1, wherein the vacuum chamber is evacuated prior to the application or during the application of the slight load upon the work piece.

5. The method according to claim 4, wherein the vacuum chamber is evacuated prior to the application or during the application of the slight load only up to a preliminary vacuum level, and the vacuum chamber is evacuated completely only upon the slight load being lifted off the work piece before the compression means applies the processing load upon the work piece.

6. The method according to claim 1, wherein the work piece is laminated at the processing load having a specific surface pressure of at least 1020 mbar to approx. 2000 mbar.

7. The method according to claim 6, wherein the processing load is applied upon the work piece when the adhesive layer has reached a temperature from approximately 70% to approximately 100% of the activation temperature.

8. The method according to claim 1, wherein the lamination of the work piece in the vacuum lamination press, upon creation of a first adhesive effect of the adhesive layer encapsulating the work piece in an air-tight fashion, is interrupted and the work piece is brought into a downstream laminator, and here further laminated at a temperature at or above the activation temperature of the adhesive layer as well as under the processing load or an increased load in comparison to the slight load.

9. The method according to claim 8, wherein the work piece, after the further lamination in the laminator, is brought into a curing kiln in which the work piece is subjected to a heat treatment without any load being applied.

10. The method according to claim 1, wherein the slight load is equivalent to a specific surface load from approx. 20 mbar to approx. 200 mbar.

* * * * *